(12) United States Patent
You et al.

(10) Patent No.: US 12,157,359 B2
(45) Date of Patent: Dec. 3, 2024

(54) BATTERY, DRIVING APPARATUS, AND VEHICLE

(71) Applicant: CONTEMPORARY AMPEREX TECHNOLOGY (HONG KONG) LIMITED, Hong Kong (CN)

(72) Inventors: Kaijie You, Ningde (CN); Xingdi Chen, Ningde (CN); Yongguang Wang, Ningde (CN); Zequan Lu, Ningde (CN); Yu Tang, Ningde (CN); Zhichao Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 434 days.

(21) Appl. No.: 17/516,510

(22) Filed: Nov. 1, 2021

(65) Prior Publication Data
US 2022/0048377 A1    Feb. 17, 2022

Related U.S. Application Data

(63) Continuation of application No. PCT/CN2020/102825, filed on Jul. 17, 2020.

(30) Foreign Application Priority Data

Sep. 17, 2019    (CN) .......................... 201921540884.4

(51) Int. Cl.
*B60K 1/04*    (2019.01)
*B60L 50/64*    (2019.01)
(Continued)

(52) U.S. Cl.
CPC ................ *B60K 1/04* (2013.01); *B60L 50/64* (2019.02); *H01M 50/209* (2021.01);
(Continued)

(58) Field of Classification Search
CPC .............. B60K 1/04; B60K 2001/0438; B60K 2001/0472; H01M 50/183
See application file for complete search history.

(56) References Cited

U.S. PATENT DOCUMENTS 8,900,744 B2 * 12/2014 Loo ........................ B60L 50/64
                                                                    429/185
9,956,859 B2 *  5/2018 Ikeda .................. H01M 8/2465
(Continued)

FOREIGN PATENT DOCUMENTS

CN    106740027 A  *  5/2017
CN    107305934 A  * 10/2017    .......... H01M 50/183
(Continued)

OTHER PUBLICATIONS

Contemporary Amperex Technology Co., Limited, International Search Report and Written Opinion, PCT/CN2020/102825, Sep. 29, 2020, 12 pgs.

*Primary Examiner* — Emma K Frick
(74) *Attorney, Agent, or Firm* — Kilpatrick Townsend & Stockton LLP

(57) ABSTRACT

This application relates to a vehicle, a battery, and a driving apparatus, where the battery includes: a first box body; a second box body connected to the first box body; a plurality of battery units accommodated inside an enclosure defined by the first box body and the second box body; and a sealing gasket located between the first box body and the second box body whereby the first box body and the second box body are hermetically connected. The first box body and/or the second box body is provided with a first protruding portion, a side wall of the sealing gasket is provided with a notch portion, and the notch portion runs through the sealing gasket along a thickness direction of the sealing gasket, and
(Continued)

the first protruding portion extends into the notch portion so that the first protruding portion fits with the notch portion.

10 Claims, 8 Drawing Sheets

(51) Int. Cl.
  *H01M 50/209* (2021.01)
  *H01M 50/244* (2021.01)
  *H01M 50/26* (2021.01)
  *H01M 50/264* (2021.01)
(52) U.S. Cl.
  CPC ......... *H01M 50/244* (2021.01); *H01M 50/26* (2021.01); *H01M 50/264* (2021.01); *B60K 2001/0438* (2013.01); *H01M 2220/20* (2013.01)

(56) References Cited

U.S. PATENT DOCUMENTS

| | | | | |
|---|---|---|---|---|
| 10,418,309 B1 * | 9/2019 | Sahu | ................... | H01L 21/4882 |
| 10,731,760 B2 * | 8/2020 | Ishigami | .............. | F16J 15/0893 |
| 10,857,868 B2 * | 12/2020 | Schmidt | ................... | B60K 1/04 |
| 11,139,526 B2 * | 10/2021 | Zeng | .................. | B65D 21/0217 |
| 11,346,492 B2 * | 5/2022 | Magarotto | ............ | F16B 5/0685 |
| 11,488,890 B2 * | 11/2022 | Padilla | .................. | H01L 23/433 |

FOREIGN PATENT DOCUMENTS

| | | | | | |
|---|---|---|---|---|---|
| CN | 206742323 U | | 12/2017 | | |
| CN | 107994146 A | | 5/2018 | | |
| CN | 207624772 U | * | 7/2018 | ............ | H01M 50/20 |
| CN | 207661110 U | * | 7/2018 | | |
| CN | 207719295 U | * | 8/2018 | | |
| CN | 108767145 A | * | 11/2018 | | |
| CN | 208127249 U | | 11/2018 | | |
| CN | 208336323 U | | 1/2019 | | |
| CN | 208738328 U | * | 4/2019 | | |
| CN | 210467924 U | | 5/2020 | | |
| CN | 111740039 A | * | 10/2020 | | |
| FR | 3092527 A1 | * | 8/2020 | | |
| WO | WO2017150941 A2 | | 9/2017 | | |
| WO | WO2018088577 A1 | | 5/2018 | | |

* cited by examiner

BATTERY, DRIVING APPARATUS, AND VEHICLE

CROSS-REFERENCE TO RELATED APPLICATIONS

This application is a continuation application of PCT Patent Application No. PCT/CN2020/102825, entitled "BATTERY, DRIVE DEVICE, AND VEHICLE" filed on Jul. 17, 2020, which claims priority to Chinese Patent Application No. 201921540884.4, filed with the State Intellectual Property Office of the People's Republic of China on Sep. 17, 2019, and entitled "BATTERY PACK AND VEHICLE", all of which are incorporated herein by reference in their entirety.

TECHNICAL FIELD

This application relates to the technical field of energy storage devices, and in particular, to a battery, a driving apparatus, and a vehicle.

BACKGROUND

A battery pack includes a first box body and a second box body that are connected to form a cavity for accommodating a battery unit. In addition, to make the cavity sealed, a sealing gasket is arranged between the first box body and the second box body. However, when the battery pack vibrates during operation, the sealing gasket is at risk of displacement, reducing airtightness of the cavity.

SUMMARY

This application provides a battery, a driving apparatus, and a vehicle, where the battery has a highly airtight cavity.

A first aspect of this application provides a battery, including:
  a first box body;
  a second box body connected to the first box body;
  a plurality of battery units accommodated inside an enclosure defined by the first box body and the second box body; and
  a sealing gasket located between the first box body and the second box body whereby the first box body and the second box body are hermetically connected;
  where the first box body and/or the second box body is provided with a first protruding portion, a side wall of the sealing gasket is provided with a notch portion, and the notch portion runs through the sealing gasket along a thickness direction of the sealing gasket, and the first protruding portion extends into the notch portion so that the first protruding portion fits with the notch portion.

In a possible design, the sealing gasket, after being compressed, has a second thickness that is equal to a protrusion height of the first protruding portion.

In a possible design, the first protruding portion is a cylindrical structure; and the notch portion includes a first side wall, where the first side wall is arc-shaped, and a side wall of the first protruding portion abuts against the first side wall.

In a possible design, in a length direction of the battery, two ends of the second box body are both provided with first protruding portions, and two ends of the sealing gasket are both provided with notch portions; and/or in a width direction of the battery, two ends of the second box body are both provided with first protruding portions, and two ends of the sealing gasket are both provided with notch portions.

In a possible design, the battery further includes a connecting piece;
  the first protruding portion is provided with a first mounting hole, the first box body is provided with a second mounting hole, and the second box body is provided with a third mounting hole; and
  the connecting piece runs through the second mounting hole, the first mounting hole, and the third mounting hole to fasten the first box body to the second box body.

In a possible design, the second box body is located below the first box body;
  the first box body includes a first body portion and a first connecting portion, and the first connecting portion is connected to a periphery of the first body portion;
  the second box body comprises a second body portion and a second connecting portion, and the second connecting portion is connected to a periphery of the second body portion;
  the first protruding portion is arranged on the second connecting portion; and
  the sealing gasket is arranged between the first connecting portion and the second connecting portion, and the sealing gasket is connected to the first connecting portion and the second connecting portion.

In a possible design, the sealing gasket includes multiple sealing strips, and the sealing strips are connected to form an annular structure;
  the sealing strip includes an inner wall and a first outer wall that are disposed opposite each other, and the inner wall is located at a side of the first outer wall closer to the battery units; and
  the notch portion is arranged in the first outer wall.

In a possible design, a distance between the first outer wall and the inner wall is greater than 7 mm.

In a possible design, the first connecting portion includes a second protruding portion and a recessed portion, and the second protruding portion and the recessed portion are joined and arranged alternately;
  the second protruding portion protrudes away from the first protruding portion, and the recessed portion is recessed towards the first protruding portion; and
  the second protruding portion is arranged opposite the first protruding portion.

In a possible design, the recessed portion includes a second side wall; and
  the second side wall is located at a side of the first outer wall away from the battery units.

A second aspect of this application further provides a driving apparatus including the foregoing battery.

A third aspect of this application further provides a vehicle including the foregoing battery.

In the battery, driving apparatus and vehicle described above, the sealing gasket is provided with the notch portion that fits with the first box body and/or the second box body. As the first protruding portion and the notch portion fit with each other, the first box body and/or the second box body can limit displacement of the sealing gasket, making the sealing gasket perform better in sealing the cavity. In addition, the sealing gasket with the notch portion not only ensures the sealing performance, but also makes the sealing gasket smaller in size, thereby reducing costs and weight of a battery pack, and improving energy density.

It should be understood that the foregoing general description and the following detailed description are only exemplary and are not intended to limit this application.

The accompanying drawings herein are incorporated into this specification and form a part of this specification, which illustrate the embodiments conforming to this application, and are intended to explain the principles of this application together with the specification.

DESCRIPTION OF EMBODIMENTS

To help better understand the technical solutions of this application, the following describes the embodiments of this application with reference to the accompanying drawings.
Apparently, the described embodiments are merely some but not all of the embodiments of this application. All other embodiments obtained by a person of ordinary skill in the art based on the embodiments of this application without creative efforts shall fall within the protection scope of this application.

The terms used in the embodiments of this application are merely intended to describe specific embodiments, but not intended to limit this application. The terms "a/an", "the" and "this" of singular forms used in the embodiments and the appended claims of this application are also intended to include plural forms, unless otherwise specified in the context clearly.

It should be understood that in this specification, the term "and/or" is only an associative relationship for describing associated objects, indicating that three relationships may exist. For example, A and/or B may indicate three cases: only A; both A and B; and only B. In addition, a character "/" in this specification generally indicates an "or" relationship between contextually associated objects.

It should be noted that the directional terms such as "above", "under", "left", and "right" described in the embodiments of this application are described as seen from the angles shown in the accompanying drawings, and should not be understood as limitations to the embodiments of this application. In addition, in the context, it should be further understood that when an element is referred to as being "above" or "under" another element, the element can not only be directly connected "above" or "under" the another element, but also be indirectly connected "above" or "under" the another element through an intermediate element.

Figure 1:
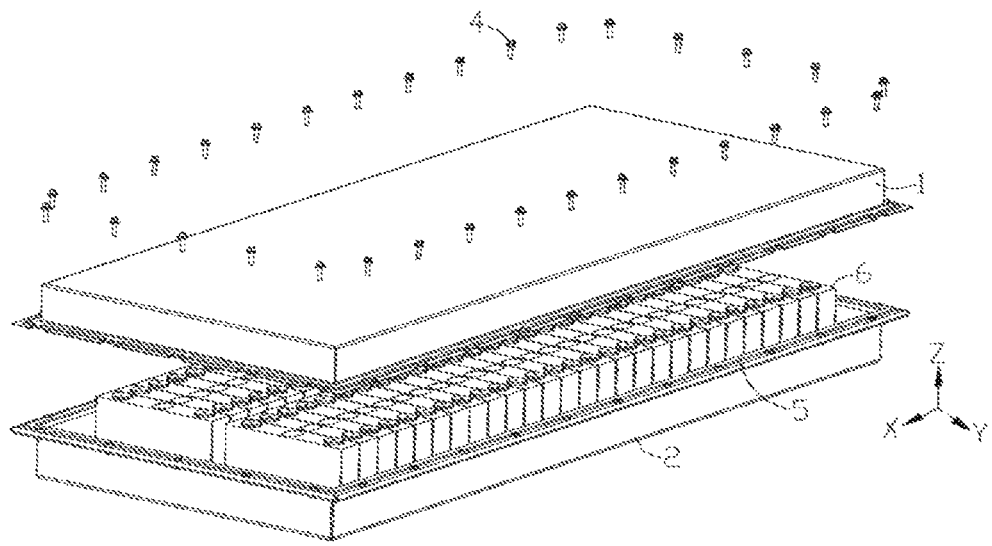
FIG. 1 is an exploded view of a battery pack according to a specific embodiment of this application.
Figure 13:
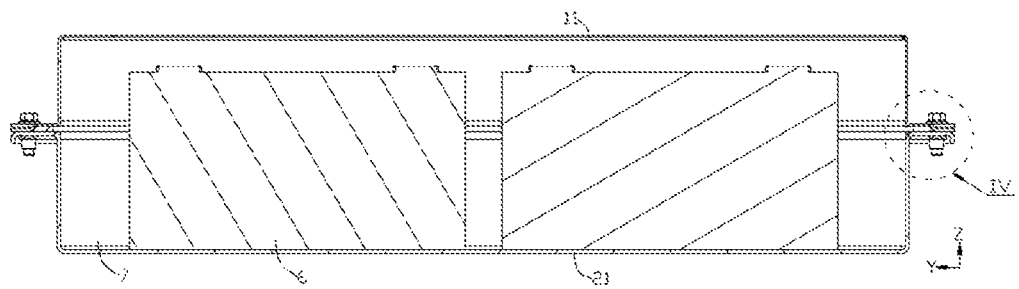
FIG. 13 is a cross-sectional view of the battery pack in FIG. 1.

In a specific embodiment, this application provides a battery pack that is used for a vehicle. The vehicle, which may be an electric vehicle, includes a vehicle body and a driving apparatus. The driving apparatus includes a battery pack and is configured to drive the vehicle body to move along a road. That is, the battery pack provides driving force for the vehicle. As shown in FIG. 1 and FIG. 13, the battery pack includes a box body and multiple battery units 6, where the box body includes a cavity 7, and the multiple battery units 6 are stacked in the cavity 7. The box body includes a first box body 1 and a second box body 2, and the first box body 1 and the second box body 2 are connected to form the cavity 7. In a possible design, the box body may be made of aluminum, lithium-aluminum alloy, or other metal materials. The battery unit 6 is a chargeable secondary battery and includes electrode terminals. Electrode terminals of the multiple battery units 6 may be connected electrically and specifically in series, parallel, or both series and parallel.

In addition, the battery pack further includes a sealing gasket 5, where the sealing gasket 5 is located between the first box body 1 and the second box body 2, and is connected to the first box body 1 and the second box body 2, thereby making the cavity 7 better sealed with the sealing gasket 5, reducing the risk of external dust, liquid, and other foreign substances entering the cavity 7, and improving safety and service life of the battery unit 6. In a specific embodiment, the first box body 1 and the second box body 2 are disposed along a height direction Z and connected. That is, the first box body 1 is an upper box body, and the second box body 2 is a lower box body. Certainly, the first box body 1 and the second box body 2 may alternatively be disposed along a length direction X or a width direction Y and connected. Relative locations of the first box body 1 and the second box body 2 are not limited in this embodiment of this application.

Figure 3:
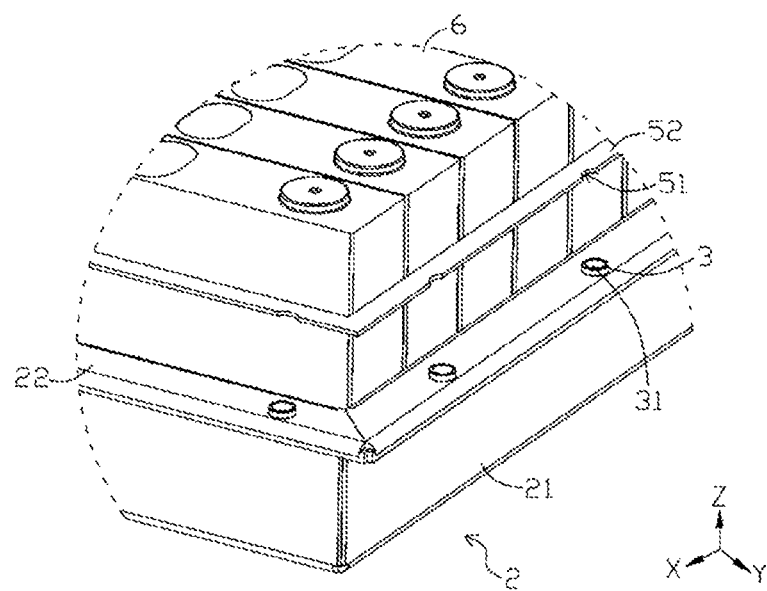
FIG. 3 is a local enlarged view of part I in FIG. 2.
Figure 4:
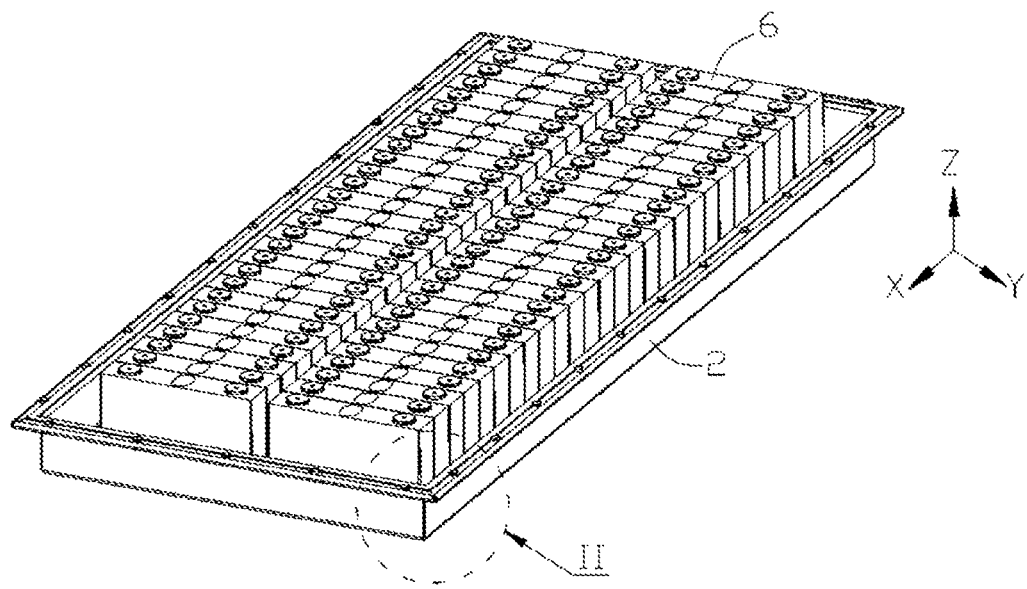
FIG. 4 is a schematic structural diagram of a second box body in FIG. 2 fitting with a sealing gasket.
Figure 5:
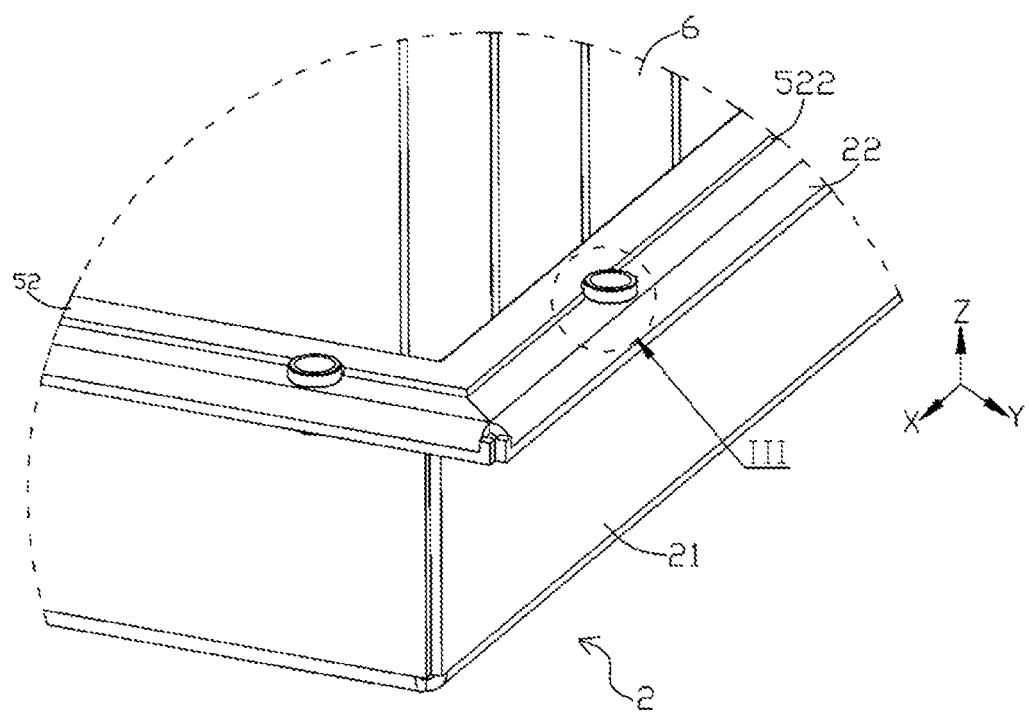
FIG. 5 is a local enlarged view of part II in FIG. 4.

Specifically, as shown in FIG. 3 and FIG. 5, the first box body 1 and/or the second box body 2 is provided with a first protruding portion 3, a side wall of the sealing gasket 5 is provided with a notch portion 51, and the notch portion 51 runs through the sealing gasket 5 along a thickness direction of the sealing gasket 5, and the first protruding portion 3 extends into the notch portion 51 with at least part of the first protruding portion 3 inside the notch portion 51, so that the first protruding portion 3 fits with the notch portion 51. In the battery pack provided in the embodiment of this application, the sealing gasket 5 is provided with the notch portion 51 that fits with the first protruding portion 3 of the first box body 1 and/or the second box body 2, making a side wall of the first protruding portion 3 abut against a side wall of the notch portion 51. Therefore, when the battery pack vibrates, the first protruding portion 3 and the notch portion 51 fit with each other so that the first box body 1 and/or the second box body 2 limits displacement of the sealing gasket 5, making the sealing gasket 5 perform better in sealing the cavity 7.

Figure 9:
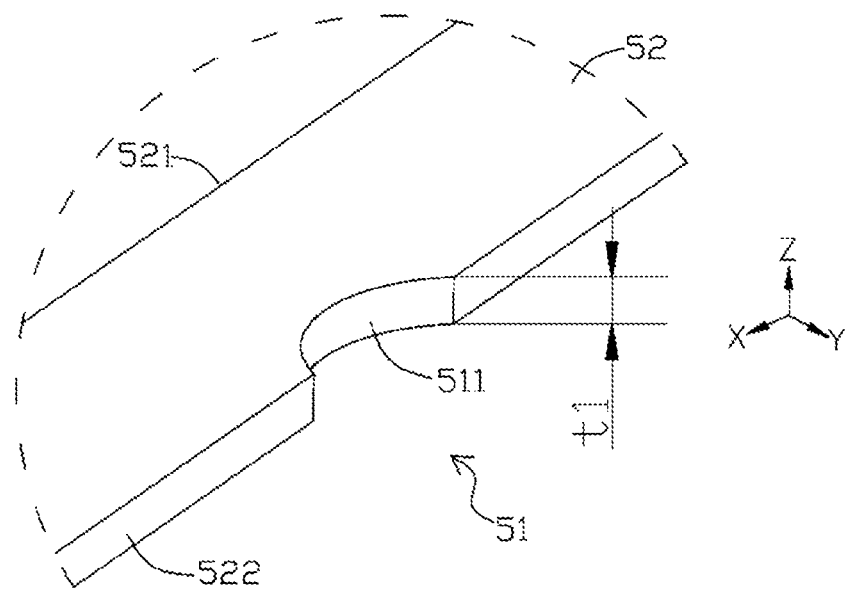
FIG. 9 is a local enlarged view of part IV in FIG. 8.

As shown in FIG. 9, the side wall of the sealing gasket 5 includes an inner wall 521 and a first outer wall 522, that is, the notch portion 51 may be arranged in the inner wall 521, or in the first outer wall 522, provided that the sealing gasket 5 can be prevented from being displaced by the first protruding portion 3 and the notch portion 51. In an embodiment of this application, the notch portion 51 may be arranged in the first outer wall 522.

Certainly, in order to reduce the risk of displacement of the sealing gasket 5 under vibration, the sealing gasket 5 may alternatively be provided with a through hole that fits with the first protruding portion 3. The through hole runs through the sealing gasket 5 along the thickness direction of the sealing gasket 5, and the first protruding portion 3 extends into the sealing gasket 5 and fits with the through hole, which can also limit displacement of the sealing gasket 5. However, the though hole means a closed side wall, and to fit with the first protruding portion 3, the through hole has to surround the first protruding portion 3, while the notch portion 51 means an open side wall, and to fit with the first protruding portion 3, the notch portion 51 does not have to surround the first protruding portion 3. Therefore, for example, for a circular through hole and an arc-shaped protruding portion that have a same diameter, the sealing gasket 5 with the circular through hole is larger in size than the sealing gasket 5 with the arc-shaped protruding portion 51.

Based on this, compared with the sealing gasket 5 with a through hole, the sealing gasket 5 with a notch portion 51 not only ensures the sealing performance, but also makes the sealing gasket 5 smaller in size, thereby reducing costs and weight of the battery pack, and improving energy density.

Specifically, in order to further reduce the risk of displacement of the sealing gasket 5, the battery pack includes multiple first protruding portions 3, where in the length direction X of the battery pack, two ends of the box body are both provided with first protruding portions 3, and two ends of the sealing gasket 5 are both provided with notch portions 51. The first protruding portions 3 fit with the corresponding notch portions 51, limiting displacement of the sealing gasket 5 in the length direction X of the battery pack; and/or in the width direction Y of the battery pack, two ends of the box body are both provided with first protruding portions 3, and two ends of the sealing gasket 5 are both provided with notch portions 51. The first protruding portions 3 fit with the corresponding notch portions 51, limiting displacement of the sealing gasket 5 in the width direction Y of the battery pack.

More specifically, the first protruding portions 3 may be arranged all on the first box body 1, or all on the second box body 2, or part of them on the first box body 1 and the rest on the second box body 2. For example, first protruding portions 3 located at the two ends of the battery pack in the length direction X may all be arranged on the first box body 1, and first protruding portions 3 located at the two ends of the battery pack in the width direction Y may all be arranged on the second box body 2.

Figure 2:
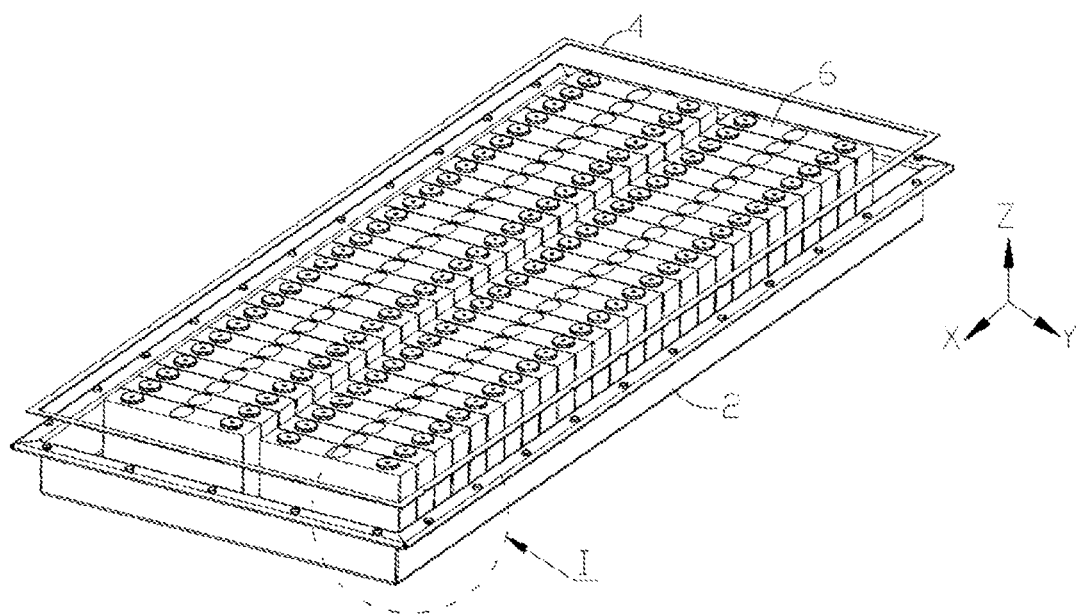
FIG. 2 is a schematic structural diagram of FIG. 1 without a first box body and a connecting piece.

In an embodiment in FIG. 2, the first protruding portions 3 of the box body are all arranged on the second box body 2. In this case, it is only necessary to process first protruding portions 3 on the second box body 2 without changing structure of the first box body 1, thereby reducing processing procedures.

Figure 6:
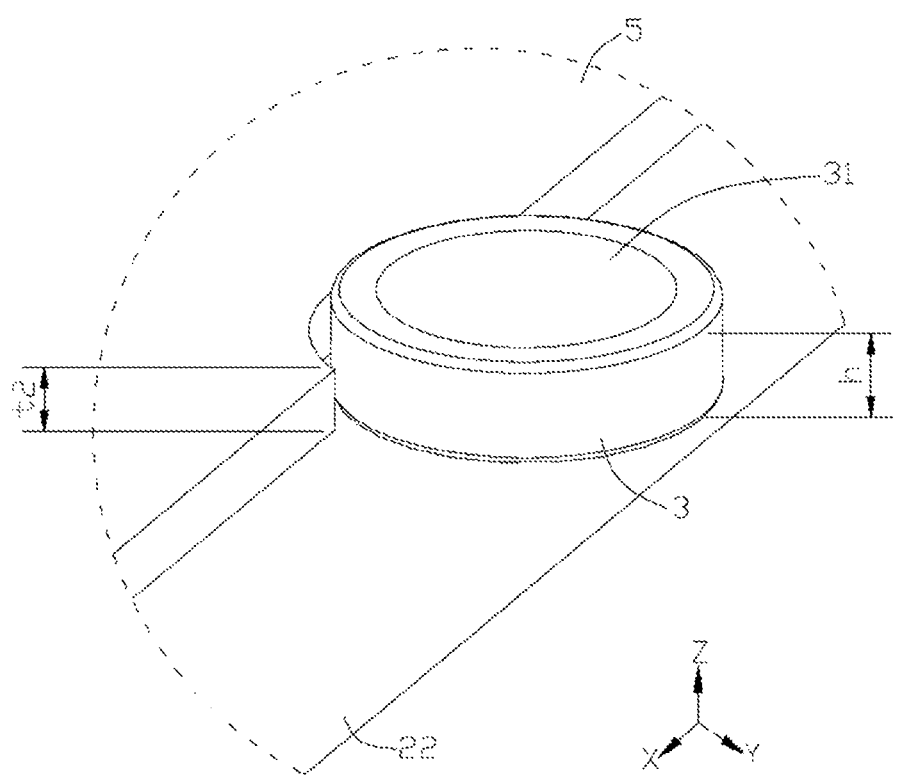
FIG. 6 is a local enlarged view of part III in FIG. 5.

In a possible design, as shown in FIG. 9, before the first box body 1 and the second box body 2 are fixedly connected, the sealing gasket 5 is not compressed and has a first thickness t1. As shown in FIG. 6, after the first box body 1 and the second box body 2 are fixedly connected, they compress the sealing gasket 5, and the sealing gasket 5 has a second thickness t2, where t2<t1. A difference between t1 and t2 is a compression amount of the sealing gasket 5 after the first box body 1 and the second box body 2 are fixedly connected. When the compression amount is excessively small, the sealing between the first box body 1 and the second box body 2 is poor, while when the compression amount is excessively large, the sealing gasket 5 will fail due to over compression, worsening the sealing between the first box body 1 and the second box body 2. Therefore, in order to ensure the sealing between the first box body 1 and the second box body 2, the compression amount of the sealing gasket 5 needs to be controlled in a reasonable range.

In the embodiment, after the first box body 1 and the second box body 2 are fixedly connected, a preset distance is present between the first box body 1 and the second box body 2 due to presence of the first protruding portion 3, and the preset distance is equal to a protrusion height h of the first protruding portion 3. After the sealing gasket 5 is compressed, its second thickness t2 is equal to the protrusion height h of the first protruding portion 3, and when the protrusion height h changes, the second thickness t2 changes accordingly. Therefore, in the embodiment, the compression amount of the sealing gasket 5 is controlled in a reasonable range by controlling the protrusion height h of the first protruding portion 3, thereby ensuring the sealing between the first box body 1 and the second box body 2.

In a specific embodiment, as shown in the drawings, the first protruding portion 3 is a cylindrical structure. Correspondingly, the notch portion 51 includes a first side wall 511, where the first side wall 511 is arc-shaped, and the side wall of the first protruding portion 3 abuts against the first side wall 511.

Further, the arc-shaped first side wall 511 of the notch portion 51 allows the first side wall 511 to totally abut against the side wall of the first protruding portion 3, thereby improving reliability of the fitting between the first protruding portion 3 and the notch portion 51. The central angle of the arc-shaped notch portion 51 is less than or equal to 180°, which means that an opening of the notch portion 51 is relatively large, making it convenient for the first protruding portion 3 to abut against the first notch portion 51, and further reducing the area of the sealing gasket 5.

Figure 7:
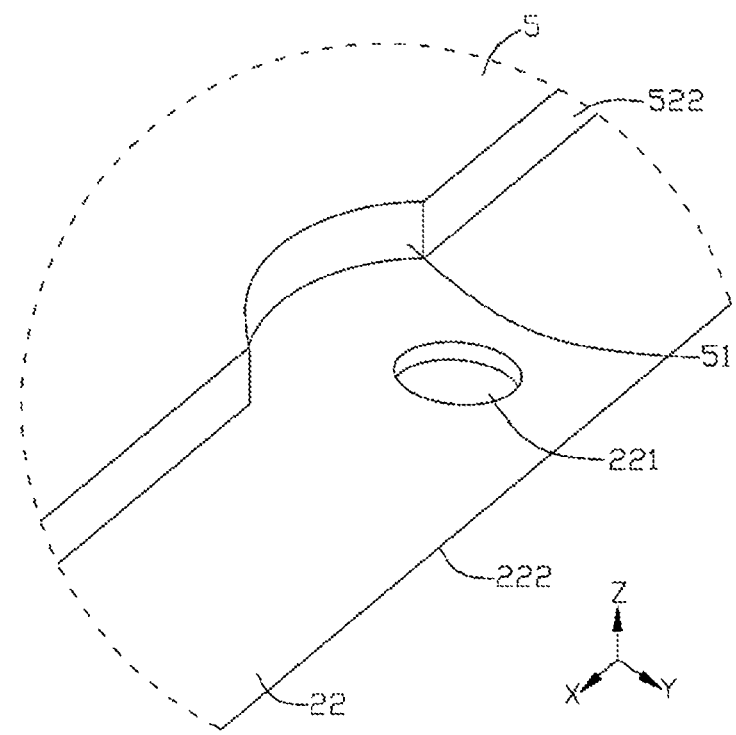
FIG. 7 is a schematic structural diagram of the part in FIG. 6 without a first protruding portion.
Figure 11:
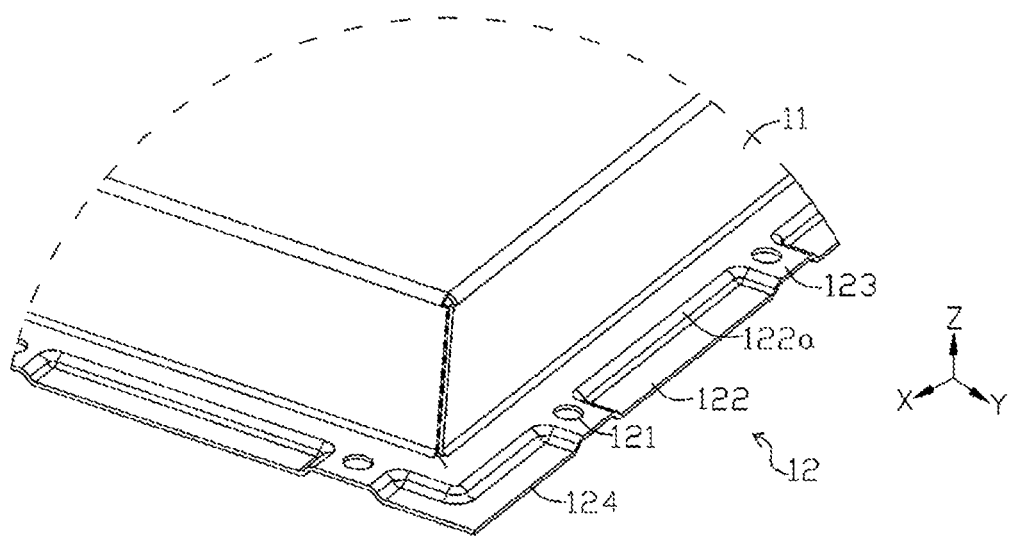
FIG. 11 is a local enlarged view of part V in FIG. 10.

In the foregoing embodiments, as shown in FIG. 1, the battery pack further includes a connecting piece 4, where the connecting piece 4 is configured to connect the first box body 1 and the second box body 2. Specifically, as shown in FIG. 6, FIG. 7, and FIG. 11, the first protruding portion 3 is provided with a first mounting hole 31, the first box body 1 is provided with a second mounting hole 121, and the second box body 2 is provided with a third mounting hole 221. The first mounting hole 31, the second mounting hole 121, and the third mounting hole 221 are communicated, and the connecting piece 4 runs through the first mounting hole 31, the second mounting hole 121, and the third mounting hole 221, and is connected to all the three mounting holes, so as to fasten the first box body 1 and the second box body 2 with the connecting piece 4 and compress the sealing gasket 5.

In the embodiment, the first protruding portion 3 not only functions to limit the position of the sealing gasket 5 but also plays a role in connecting the first box body 1 and the second box body 2. The first protruding portion 3 can increase a fitting length of the connecting piece 4 with the second box body 2, thereby improving reliability of the connection between the connecting piece 4 and the second box body 2.

In the embodiment, in a case that a distance between adjacent mounting holes is excessively large, the connection between the first box body 1 and the second box body 2 is less reliable, and the sealing gasket 5 has a low sealing performance. Therefore, the distance between adjacent first mounting holes 31 (or adjacent second mounting holes 121, or adjacent third mounting holes 221) is 60 mm to 120 mm.

In a specific embodiment, the first mounting hole 31, the second mounting hole 121, and the third mounting hole 221 may all be threaded holes, and the connecting piece 4 may be a bolt.

Figure 10:
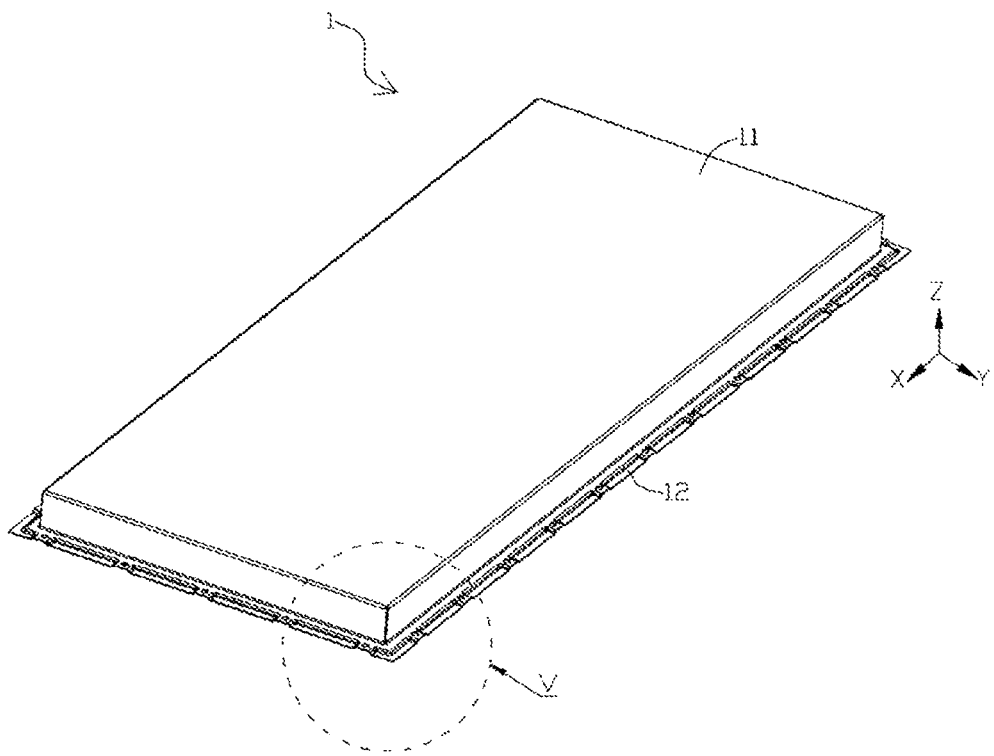
FIG. 10 is a schematic structural diagram of the first box body in FIG. 1.
Figure 12:
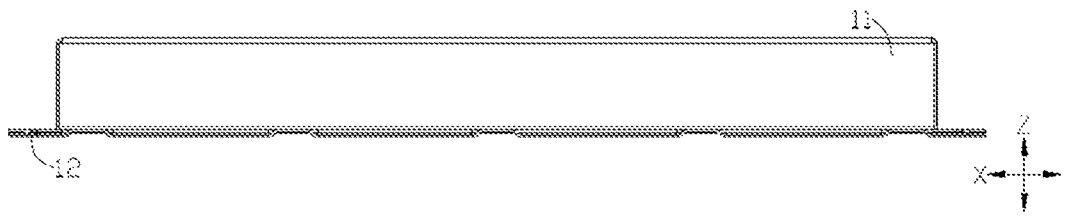
FIG. 12 is a side view of FIG. 10.

In a possible design, as shown in FIG. 10 to FIG. 12, the first box body 1 includes a first body portion 11 and a first connecting portion 12, where the first connecting portion 12 is connected to a periphery of the first body portion 11 and extends outward from the first body portion 11. Similarly, as shown in FIG. 3 and FIG. 5, the second box body 2 includes a second body portion 21 and a second connecting portion 22, where the second connecting portion 22 is connected to a periphery of the second body portion 21 and extends outward from the second body portion 21. The first box body 1 and the second box body 2 are fixedly connected through the first connecting portion 12 and the second connecting portion 22. After they are connected, the first body portion 11 and the second body portion 21 form the cavity 7.

Specifically, the first protruding portion 3 is arranged on the second connecting portion 22, the second mounting hole 121 is arranged on the first connecting portion 12, the third mounting hole 221 is arranged on the second connecting portion 22, the sealing gasket 5 is arranged between the first connecting portion 12 and the second connecting portion 22, and the sealing gasket 5 is connected to the first connecting portion 12 and the second connecting portion 22.

Figure 8:
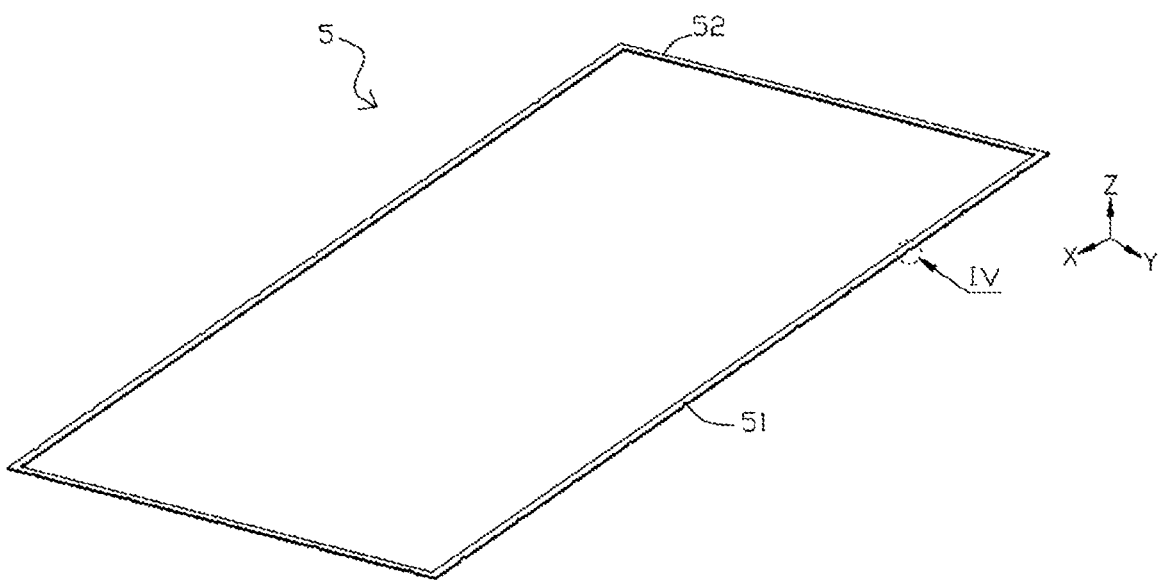
FIG. 8 is a schematic structural diagram of the sealing gasket in FIG. 1.

Specifically, as shown in FIG. 8, the sealing gasket 5 includes multiple sealing strips 52. The sealing strips 52 are connected to form an annular structure, and the sealing strips 52 are all located between the first connecting portion 12 and the second connecting portion 22. As shown in FIG. 9, the sealing strip 52 includes an inner wall 521 and a first outer wall 522 that are disposed opposite each other, and the inner wall 521 is located at a side of the first outer wall 522 closer to the battery units 6. The notch portion 51 is arranged in the first outer wall 522. Therefore, while displacement of the sealing gasket 5 is prevented, width of the sealing strip 52 can be reduced, and it is convenient for the first protruding portion 3 and the notch portion 51 to fit with each other when the notch portion 51 is located at an outer side of the sealing strip 52.

In addition, as shown in FIG. 7, the second connecting portion 22 has a second outer wall 222 away from the battery units 6. The first outer wall 522 is located at a side of the second outer wall 222 closer to the battery units 6, and the first protruding portion 3 is located at a side of the second outer wall 222 closer to the battery units 6.

In the embodiment, along an inside-out direction (a direction leaving the battery pack cavity 7), the inner wall 521 of the sealing strip 52, the first outer wall 522 of the sealing strip 52, the first protruding portion 3, and the second outer wall 222 of the second connecting portion 22 are arranged in sequence. Therefore, in the embodiment, an area of the sealing strip 52 is less than an area of the first connecting portion 12 and an area of the second connecting portion 22, which means that the sealing strip 52 does not exceed out from the first box body 1 and the second box body 2. Therefore, the sealing gasket 5 will not enlarge an outer contour of the battery pack, thereby avoiding affecting other components of a vehicle.

More specifically, in the sealing strip 52, a distance between the first outer wall 522 and the inner wall 521 is the width of the sealing strip 52, suggesting the largest sealing area of the sealing strip 52. In order to ensure the sealing between the first box body 1 and the second box body 2, the distance between the first outer wall 522 and the inner wall 521 is greater than 7 mm. For example, the width of the sealing strip 52 may be 9 mm or 10 mm. Certainly, the width of the sealing strip 52 can be set based on a specific size of the battery pack. This is not limited herein.

In the foregoing embodiments, as shown in FIG. 11, in the first box body 1, the first connecting portion 12 includes a second protruding portion 123 and a recessed portion 122, and the second protruding portion 123 and the recessed portion 122 are joined to form the first connecting portion 12. The second protruding portion 123 and the recessed portion 122 are arranged alternately, making the first connecting portion 12 firmer and hard to deform, thereby improving the sealing performance. A transition part between the second protruding portion 123 and the recessed portion 122 is rounded, helping reduce stress concentrated at the first connecting portion 12.

Specifically, as shown in FIG. 11, the second protruding portion 123 protrudes away from the first protruding portion 3, and with such protrusion, the first protruding portion 3 is located between the second protruding portion 123 and the second connecting portion 22. This means that, along the height direction Z, the first protruding portion 3 and the second protruding portion 123 are disposed opposite each other, and the second mounting hole 121 is provided in the second protruding portion 123. The recessed portion 122 is recessed towards the first protruding portion 3, and with such recession, the recessed portion 122 abuts against and compresses the sealing gasket 5.

Therefore, in the embodiment, the first connecting portion 12 is provided with the second protruding portion 123 and the recessed portion 122, which can fit with the second connecting portion 22 provided with the first protruding portion 3 (the second protruding portion 123 is used to provide a space for arranging the first protruding portion 3), thereby improving the connection reliability and sealing between the first connecting portion 12 and the second connecting portion 22.

Figure 14:
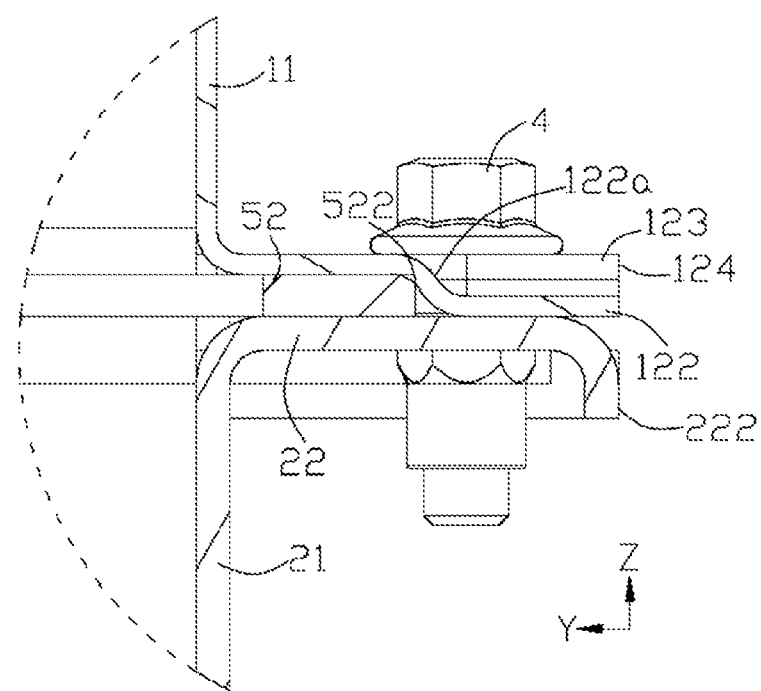
FIG. 14 is a local enlarged view of part VI in FIG. 13.
Reference signs are described as follows:
1. first box body;
　11. first body portion;
　12. first connecting portion;
　　121. second mounting hole;
　　122. recessed portion;
　　122a. second side wall;
　　123. second protruding portion;
　　124. third outer wall;
2. second box body;
　21. second body portion;
　22. second connecting portion;
　　221. third mounting hole;
　　222. second outer wall;
3. first protruding portion;
　31. first mounting hole;
4. connecting piece;
5. sealing gasket;
　51. notch portion;
　　511. first side wall;
　52. sealing strip;
　　521. inner wall;
　　522. first outer wall;
6. battery unit;
7. cavity; and
t1. first thickness, t2. second thickness, and h. protrusion height.

More specifically, as shown in FIG. 11 and FIG. 14, the second connecting portion 22 has a third outer wall 124, and the recessed portion 122 includes a second side wall 122a. The second side wall 122a is located at a side of the third outer wall 124 (or the second outer wall 222) closer to the battery units 6, and the second side wall 122a is located at a side of the first outer wall 522 away from the battery units 6, which means that the second side wall 122a is located between the first outer wall 522 and the third outer wall 124.

In the embodiment, in the height direction Z, the recessed portion 122 does not contact the sealing gasket 5, which means that the recessed portion 122 is recessed towards the second connecting portion 22 without compressing the sealing gasket 5, thereby preventing sealing failure caused by the recessed portion 122 over compressing the sealing gasket 5 and ensuring the sealing between the first box body 1 and the second box body 2.

In another embodiment of this application, the battery pack may alternatively be referred to as a battery.

The foregoing are merely embodiments of this application, which are not intended to limit this application. A person skilled in the art understands that this application may have various modifications and variations. Any modification, equivalent replacement, and improvement made without departing from the spirit and principle of this application shall fall within the protection scope of this application.

What is claimed is:

1. A battery, comprising:
   a first box body;
   a second box body connected to the first box body;
   a plurality of battery units accommodated inside an enclosure defined by the first box body and the second box body; and
   a sealing gasket located between the first box body and the second box body whereby the first box body and the second box body are hermetically connected; and, wherein
   the first box body and/or the second box body is provided with a first protruding portion, a side wall of the sealing gasket is provided with a notch portion, and the notch portion runs through the sealing gasket along a thickness direction of the sealing gasket, and the first protruding portion extends into the notch portion whereby the first protruding portion fits with the notch portion;
   the second box body is located below the first box body;
   the first box body comprises a first body portion and a first connecting portion, and the first connecting portion is connected to a periphery of the first body portion;
   the second box body comprises a second body portion and a second connecting portion, and the second connecting portion is connected to a periphery of the second body portion;
   the first protruding portion is arranged on the second connecting portion;
   the sealing gasket is arranged between the first connecting portion and the second connecting portion, and the sealing gasket is connected to the first connecting portion and the second connecting portion;
   the first connecting portion comprises a second protruding portion and a recessed portion, and the second protruding portion and the recessed portion are joined and arranged alternately;
   the second protruding portion protrudes away from the first protruding portion, and the recessed portion is recessed towards the first protruding portion; and
   the second protruding portion is arranged opposite the first protruding portion.

2. The battery according to claim 1, wherein the sealing gasket, after being compressed, has a second thickness that is equal to a protrusion height of the first protruding portion.

3. The battery according to claim 1, wherein the first protruding portion is a cylindrical structure; and
   the notch portion comprises a first side wall, wherein the first side wall is arc-shaped, and a side wall of the first protruding portion abuts against the first side wall.

4. The battery according to claim 1, wherein in a length direction of the battery, two ends of the second box body are both provided with first protruding portions, and two ends of the sealing gasket are both provided with notch portions; and/or
   in a width direction of the battery, two ends of the second box body are both provided with first protruding portions, and two ends of the sealing gasket are both provided with notch portions.

5. The battery according to claim 1, wherein the battery further comprises a connecting piece;
   the first protruding portion is provided with a first mounting hole, the first box body is provided with a second mounting hole, and the second box body is provided with a third mounting hole; and
   the connecting piece runs through the second mounting hole, the first mounting hole, and the third mounting hole to fasten the first box body to the second box body.

6. The battery according to claim 1, wherein the sealing gasket comprises multiple sealing strips, and the sealing strips are connected to form an annular structure;
   the sealing strip comprises an inner wall and a first outer wall that are disposed opposite each other, and the inner wall is located at a side of the first outer wall closer to the plurality of battery units; and
   the notch portion is arranged in the first outer wall.

7. The battery according to claim 6, wherein a distance between the first outer wall and the inner wall is greater than 7 mm.

8. The battery according to claim 1, wherein the recessed portion comprises a second side wall; and
   the second side wall is located at a side of the first outer wall away from the plurality of battery units.

9. A driving apparatus, comprising the battery according to claim 1.

10. A vehicle, comprising the battery according to claim 1.

* * * * *